United States Patent [19]

Irving

[11] Patent Number: 5,492,998
[45] Date of Patent: Feb. 20, 1996

[54] CROSS-LINKED TERTIARY-AMINE POLYMERS

[75] Inventor: Nicholas M. Irving, Mixco, Guatemala

[73] Assignees: Lifesource International, Ltd., Middleton; Jojani Inc., Newport, both of R.I.

[21] Appl. No.: 375,854

[22] Filed: Jan. 20, 1995

Related U.S. Application Data

[63] Continuation-in-part of Ser. No. 940,915, Sep. 8, 1992, abandoned.

[51] Int. Cl.⁶ .................................................. C08G 14/02
[52] U.S. Cl. .................. 528/230; 528/102; 528/107; 528/108; 528/109; 528/119; 528/120; 528/121; 528/124; 528/125; 528/128; 528/129; 528/162; 528/220; 528/228; 528/244; 528/272; 528/287; 528/288; 528/290; 528/293; 525/400; 525/491; 525/492; 525/495
[58] Field of Search ....................... 528/102, 107, 528/108, 109, 119, 120, 121, 124, 125, 128, 129, 162, 220, 228, 230, 244, 272, 287, 288, 290, 293; 525/400, 491, 492, 495, 503, 509

[56] References Cited

U.S. PATENT DOCUMENTS

| | | | |
|---|---|---|---|
| 4,231,759 | 11/1980 | Udelhofen et al. | 44/75 |
| 4,396,517 | 8/1983 | Gemmill, Jr. et al. | 252/51.5 R |
| 4,912,247 | 3/1990 | Roling | 558/306 |
| 5,026,495 | 6/1991 | Emert et al. | 252/51.5 R |

*Primary Examiner*—Samuel A. Acquah
*Attorney, Agent, or Firm*—Cesari and McKenna

[57] ABSTRACT

Novel polymers of general formula:

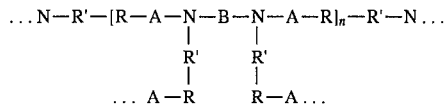

wherein R is an alkyl or aryl group that contains an active hydrogen atom (as determined by the Zerewitinoff test); A is a spacing group having at least one carbon atom; B is a spacing group having at least two carbon atoms; and R and R' are alkyl or aryl groups. The polymer is synthesized via the Mannich pathway, involving formation of an imine intermediate.

17 Claims, No Drawings

5,492,998

CROSS-LINKED TERTIARY-AMINE POLYMERS

RELATED APPLICATION

This is a continuation-in-part of Ser. No. 07/940,915, filed Sep. 8, 1992, now abandoned.

BACKGROUND OF THE INVENTION

1. Field of the Invention

This invention relates generally to new and useful chemical compounds, and more particularly to cross-linkable polymers generated using the Mannich reaction.

2. Description of the Related Art

The Mannich reaction provides a synthetic route to production of amine derivatives from materials containing active hydrogen atoms. An amine compound (i.e., ammonia or a primary or secondary amine) is reacted under mild acid or alkaline conditions with formaldehyde and a compound (often a ketone) that contains at least one active hydrogen atom to form the substituted amine derivative, with the active hydrogen atom replaced by a methylene group (derived from formaldehyde) which is also bound to the nitrogen atom.

The Mannich reaction has also been used to generate oligomers and polymers by combining two moles of formaldehyde for every mole of active-hydrogen compound and ammonia or primary amine. See, e.g., Tsuchida & Hasegawa, 14 *Polym. Lett. Edn.* 103 (1976). Mannich oligomers and polymers of this type are primarily (if not completely) linear, and do not provide molecular sites where cross-linking can take place. Their industrial application, accordingly, is limited. Other examples of linear Mannich polymers appear in U.S. Pat. Nos. 4,231,759; 4,396,517; 4,561,901; 4,912,247; and 5,016,495.

At the same time, traditional cross-linked polymers suffer from disadvantages as well. Typically, these are provided in the form of uncured prepolymer resins which, when exposed to a suitable triggering mechanism (e.g., heat, particular pH levels, or an additional reaction component) undergo the cross-linking reaction. The resins (as well as any necessary solvents) are ordinarily liquid. Liquids can be inconvenient to transport, imposing significant added costs of usage. Resins (and/or solvents used in conjunction therewith) may also exude foul or even toxic odors, necessitating further inconvenience and expense to maintain environmental quality. And of course the polymer itself can be costly if expensive functionalities (such as epoxy or isocyanate) are utilized.

Cross-linking polymer systems also tend to be limited in terms of versatility, since it is ordinarily difficult to vary polymer compositions sufficiently to obtain a range of rheological or other physical properties.

DESCRIPTION OF THE INVENTION

Brief Summary of the Invention

The present invention comprises a novel family of polymers in which the Mannich reaction is employed to form monomers but not the polymers themselves. Unlike known Mannich polymers, those of the present invention undergo extensive cross-linking when exposed to suitable (i.e., mildly acid or alkaline) pH conditions. Furthermore, the uncross-linked prepolymer can be brought to a powder form by combining it with a particulate support.

In one embodiment, the monomers of the present invention have the general formula:

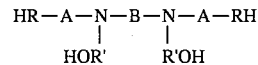

wherein R is an alkyl or aryl group that contains an active hydrogen atom (as determined by the Zerewitinoff test); A is a spacing group having at least one carbon atom; B is a spacing group having at least two carbon atoms (and which may contain additional functionality); and R' is an alkyl or aryl group that contains a hydroxyl group on the nitrogen-bound carbon atom.

The above monomer is formed by reacting a compound containing at least two amine groups with an aldehyde (preferably, although not necessarily formaldehyde) and a compound containing two active hydrogen atoms under mild acid conditions. The amine-bearing compound (of general formula $H_2N$—B—$NH_2$, using the above nomenclature) and aldehyde are combined in equimolar proportions with an excess of the active-hydrogen material (of general formula HRAH). In the first stage of reaction, carried out under reflux to digest the active-hydrogen compound, these components combine to produce a secondary-amine precursor of formula HR—A—NH—B—NH—A—RH.

In the second stage of reaction, additional active-hydrogen compound (of general formula HR'H, and which may be the same or different from that employed in the previous stage) reacts with the secondary amine to form the monomer. This stage of reaction, which is initiated when boiling under reflux ceases, occurs under distillation and produces an imine of the formula:

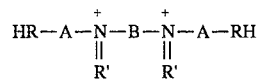

The imine rapidly polymerizes by reaction of the R' groups with the remaining active hydrogen atom on the R moieties of other monomer units to form polymers of general formula:

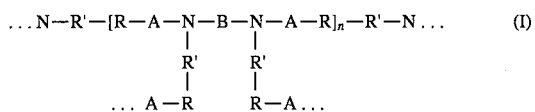

Thus, the present invention makes no distinction between linear and branch polymerization or cross-linking steps. In practical application the monomers are lightly cross-linked for provision to end users, who further react the material so it coalesces into a rigid, three-dimensional matrix.

It is advisable to choose the HR and A segments so as to prevent or minimize cyclization between the exposed active hydrogen and the imine unit; for example, chains having more than seven atomic members and/or the presence of a bulky steric group (e.g., phenyl or a phenyl derivative) along the chain undergo relatively little cyclization.

By varying the amine component, it is possible to obtain end products having widely varying physical characteristics. For example, long-chain amines tend to produce elastic polymers, while amines containing aromatic groups generally confer rigidity. Any of a range of rheological properties can be achieved by judicious selection of and combinations among amine components.

In a second embodiment, pairs of monomers having different structures are combined using successive imine additions or imine addition followed by nucleophilic addition of the amine to an enone (i.e., an α,β-unsaturated carbonyl) group formed by oxidation of a hydroxylated ketone. This latter mechanism is exemplified by the reactions:

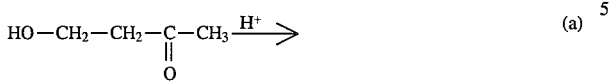 (a)

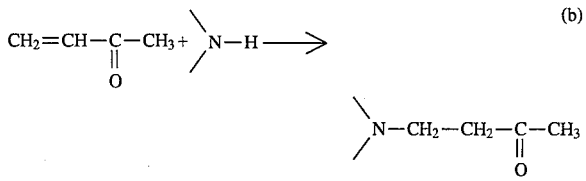 (b)

These reactions link monomers having free hydroxyl groups with those having secondary amine groups. Accordingly, monomer pairs having the following generalized structures can be linked in accordance with the present invention to form the cross-linked polymer I shown above:

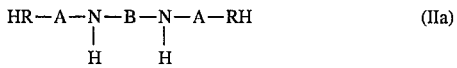 (IIa)

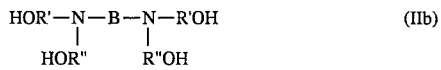 (IIb)

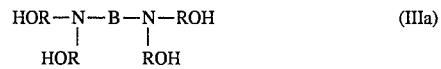 (IIIa)

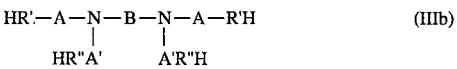 (IIIb)

 (IVa)

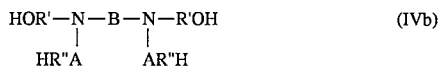 (IVb)

wherein R, R' and R" are alkyl or aryl groups; RH, R'H and R"H are alkyl or aryl groups that each contain an active hydrogen atom (as determined by the Zerewitinoff test); ROH, R'OH and R"OH are alkyl or aryl groups that each contain a hydroxyl group on the nitrogen-bound carbon atom; A, A' and A" are spacing groups having at least one carbon atom; and B is a spacing group having at least two carbon atoms (and which may contain additional functionality).

Compounds IIa and IIb first combine via the imine mechanism such that the terminal RH moieties of IIa link to the imine formed on IIb by reflux reaction to yield partially cross-linked species having free secondary amines (on the portion derived from IIa) and free hydroxyl groups (on the portion derived from IIb). Further reaction under acidic or basic conditions results in additional cross-linkage, via the enone addition mechanism, of the secondary amine of the compound IIa remnant with the newly formed enone on the compound IIb remnant to form compound I.

Because compounds IIIa contains multiple nitrogen substituents capable of forming imines, each IIIa molecule can combine with four IIIa molecules via the imine mechanism. Each IIIb molecule itself has four reaction sites, however, so the combination to form compound I via successive iterations of the imine mechanism is ultimately equimolar.

Compounds IVa and IVb first combine via the imine mechanism, with the imines formed on IVa combining with the R"H moieties of IVb, to form partially cross-linked species (on the portion derived from IVa) and free hydroxyl groups (on the portion derived from IVb). Further reaction under basic conditions results in additional cross-linkage, via the enone addition mechanism, of the secondary amine of the compound IVa remnant with the newly formed enone on the compound IVb remnant to form compound I.

Detailed Description of the Preferred Embodiments

Preferred amine compounds (of formula $H_2N-B-NH_2$) contain two terminal (primary) amine groups and, if desired to promote a denser cross-linking network, additional intervening (secondary) amine groups. These can include ethylene diamine, diethylene triamine, propylene diamine, butylene diamine, hexamethylene diamine, polyalkylene oxides having multiple amine functionalities, cyclohexylene diamine, phenylene diamine, toluene diamine, xylylene diamine, 4,4'-methylenedianiline and adducts thereof (e.g., 4,4'-methylenebis(2-chloroaniline)), 3,3'-dichloro-4,4'-diaminodiphenylmethane, melamine, and adducts of ethylene diamine or diethylamine triamine with acrylate or its hydrolyzed products. Accordingly, the spacing group B can include as few as two and as many as 300 carbon atoms. For example, Jeffamine compounds, in which numerous propylene oxide units intervene between terminal amine groups, represent useful amines; a typical Jeffamine can contain, for example, 100 intervening propylene oxide units each having three carbon atoms and one oxygen atom.

End products exhibiting significant elasticity can be obtained by employing any of a variety of polyoxyalkyleneamines, while aromatic amines (such as melamine, phenylene diamine, toluene diamine, and xylylene diamine) confer rigidity. Polymers prepared using hexamethyl diamine exhibit flexibility but resist permanent deformation. Achieving a particular type or degree of a physical characteristic based on amine selection is well within the skill of practitioners in the art.

Preferred active-hydrogen compounds (of formula HRAH or HR'H) include alkyl, aryl and mixed alkyl-aryl species. The HRAH component can be as simple as acetone (where A is methyl and R is CHO), and the HR'H compound as simple as formaldehyde. Preferably, in the case of alkyl compounds, the total chain length of the R and A components is between two and 20 carbon atoms, and most preferably contains 12 or less carbon atoms; the total chain length alkyl R' compounds can range from one to 25 carbon atoms. Useful aryl compounds for the HRAH and HR'H species include aromatic rings having one, two or three members. For example, a useful family of compounds has the chemical formula $H_3C-CO-Ar-CO-CH_3$, where Ar is substituted or unsubstituted benzene, naphthalene or anthracene.

In particular, the active-hydrogen compound can be a ketone containing at least one carbonyl group and at least two active hydrogen atoms (e.g., cyclohexanone, acetone, 2-butanone, diketones such as 2,4-pentanedione, etc.), a compound containing two or more ester moieties, a compound containing two or more nitro or nitrilo moieties, a compound containing two or more acetylene moieties, a compound containing two or more alcohol moieties, a compound containing two or more thiol moieties, phenols, carboxylic acids, and combinations of these compounds.

In the case of ketones, the carbonyl group may be converted into an ketal functionality in order to reduce volatility or to protect the ketone species from degradation. Ketals can be generated, for example, by reaction of the ketone with a 1,2 or 1,3 diol compound in acidic medium.

The HR'H compound may be an aldehyde, preferably formaldehyde or paraformaldehyde, but acetaldehyde, benzaldehyde, crotonaldehyde, furfural and other suitable compounds containing the aldehyde functionality can also be advantageously employed.

The monomers of the present invention can be copolymerized with other (preferably water-curable) species, such as urea formaldehyde, phenol formaldehyde, and/or melamine formaldehyde.

The following examples are only illustrative of preferred embodiments of this invention, which utilize the single-monomer approach, and are not intended to limit the scope thereof. All amounts and proportions referred to herein and in the appended claims are by weight and all temperatures are in °C., unless otherwise indicated.

EXAMPLE 1

This example illustrates synthesis of a polymer from monomers of formula:

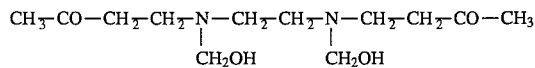

To achieve a first-stage precursor (as defined above), 5 mL (0.075 mol) of ethylenediamine was introduced into a 50-mL flask and stirred magnetically while 10 g (0.33 mol) of paraformaldehyde were added slowly through a powder funnel. A water bath was used to keep the reaction mixture cold throughout the addition. Then 12.3 mL of acetone (0.167 mol) were injected into the reaction mixture and stirred well, followed by introduction of 0.25 mL of aniline hydrochloride (20% solution). A liquid with white powder settled on the bottom was obtained. After 24 hours all of the acetone had been digested. The material was heated in a distillation unit (although, because of the small scale, little evaporation was observed), and a clear liquid formed.

4.5 g of this sample were isolated and maintained at 80° for 0.5 hour after addition thereto of 2 mL of water. A tough, glassy polymer formed.

To prepare the monomer as a solid, it is combined with 5–10% fine particles of silica gel under shearing conditions. To the resulting solid is added 1% solid lubricant (e.g., sodium stearate). Alternatively, it is possible to obtain a powder by combining the resin with alpha flock or microcrystalline cellulose powder in a 3/2 ratio of monomer to solid; however, because cellulose is ordinarily not hygroscopic, the monomer resin should be substantially free of water prior to combination. In either case, the solid is cured into a polymer matrix by addition of water and, depending on the constituents of the polymer, mild acid (preferably a conjugate acid of an amine, such as aniline or other amine hydrochloride) or a mild base (e.g., dilute NaOH).

EXAMPLE 2

This example illustrates synthesis of a polymer from monomers of formula:

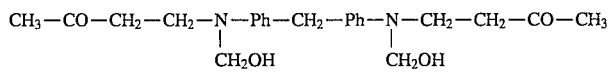

where Ph denotes a phenyl group.

To achieve a first-stage precursor, 0.075 mol of 4,4'-methylenedianiline is introduced into a 50-mL flask and stirred magnetically while 10 g (0.33 mol) of paraformaldehyde are added slowly through a powder funnel. A water bath is used to keep the reaction mixture cold throughout the addition. Then 12.3 mL of acetone (0.167 mol) are injected into the reaction mixture and stirred well, followed by introduction of 0.25 mL of aniline hydrochloride (20% solution). A liquid with white powder settled on the bottom is obtained. After 24 hours, a clear liquid (the monomer) forms. The monomer polymerizes upon addition of water and gentle heating.

EXAMPLE 3

This example illustrates synthesis of a polymer from monomers of formula:

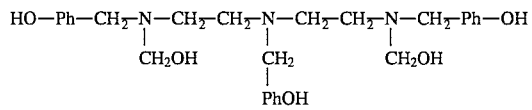

This monomer offers three internal sites for cross-linking instead of two.

To achieve a first-stage precursor, 0.075 mol of diethylenetriamine is introduced into a 50-mL flask and stirred magnetically while 15 g (0.5 mol) of paraformaldehyde are added slowly through a powder funnel. A water bath is used to keep the reaction mixture cold throughout the addition. Then 0.22 mol of phenol are injected into the reaction mixture and stirred well, followed by introduction of 0.25 mL of aniline hydrochloride (20% solution). A liquid with white powder settled on the bottom is obtained. After 24 hours, a clear liquid (the monomer) forms. The monomer polymerizes upon addition of water and gentle heating.

EXAMPLE 4

This example illustrates synthesis of a polymer from precursors of formulae IIa, IIb.

To form IIa, 18.9 l (283 mol) of ethylene diamine were charged to a reactor, following which 17 kg (520 mol) of paraformaldehyde (prills, 92%) were slowly added under external cooling and mixing. A solution of 70 g NH$_4$Cl in 350 ml of water was then added, followed by 42.4 l (577 mol) of acetone. This mixture was stirred and allowed to reflux for 7 hours to yield the product IIa.

To form IIb, a 50 g sample of IIa was mixed with 27.7 g (0.85 mol) of paraformaldehyde (prills, 92%) and stirred magnetically for 1 hour. A mild exotherm was observed, and a somewhat viscous liquid formed.

The IIa and IIb products were cured by mixing a 50 g sample of IIa with 27.7 ml of water, and combining 5 g of this mixture with 5 g of IIb. To this mixture was added 0.2 ml NaOH (aq., 25%). A tough, cured polymer formed.

EXAMPLE 5

This example illustrates synthesis of a polymer from precursors of formulae IIIa, IIIb.

To form IIIa, 20 ml (0.3 mol) of ethylene diamine were charged to a reactor, and under stirring and external cooling 39 g (1.2 mol) of paraformaldehyde (prills, 92%) were added slowly over 1 hour. This mixture was heated for 15 min. in a 60° C. water bath, following which a moderately thick, yellow liquid was obtained.

To form IIIb, the preceding sequence was repeated, and the resulting preparation was combined with 95 ml (1.29 mol) of acetone, and then with 0.65 ml (3.7 mol) of NH$_4$Cl. This mixture was kept under mild reflux for 6 hours, followed by 1 hour under faster reflux. A clear, thin, orange liquid was obtained.

The IIIa and IIIb products were cured by mixing a 10 g sample of IIIa with 22 g of IIIb. To this mixture was added 1 ml NaOH (aq., 25%). A tough, cured plastic was obtained.

EXAMPLE 6

This example illustrates synthesis of a polymer from precursors of formulae IVa, IVb.

To form IVa, 19.6 g (0.6 mol) of paraformaldehyde (prills, 92%) were added slowly, over 0.5 hour, to a flask containing 20 ml (0.3 mol) of ethylene diamine. Agitation was continued following the addition for 0.5 hour at 60° C. A very thick, yellowish paste was obtained.

IVb was formed from the IIIb compound of Example 5. The preparation sequence for IIIb was followed as described above, and the resulting compound was combined with 19.6 g (0.6 mol) of paraformaldehyde (prills, 92%). This mixture was refluxed for 4.5 hours in a 60° C. water bath.

The IVa and IVb products were cured by mixing a 1 g sample of IVa with 3.9 g of IVb. To this mixture was added 0.1 ml NaOH (aq., 25%). A gelled polymer formed fairly quickly.

Thus, it will be seen that I have provided a novel family of polymer materials that can be easily stored and transported, and cured under convenient conditions. The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed. For example, it is possible to add isopropyl alcohol to the monomer to extend shelf life. For this purpose, combining the monomer with 20–40 wt % (and most preferably 30 wt %) of isopropyl alcohol was found to substantially extend useful shelf life.

What is claimed is:

1. A cross-linked polymer of the form:

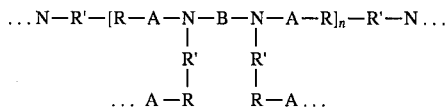

wherein R is derived from a compound having a chemical formula HRAH, where each H is an active hydrogen atoms; A is a spacing group having at least one carbon atom; B is a spacing group having at least two carbon atoms; and R is an alkyl group having no more than 20 carbon atoms or an aryl group having no more than three ring members; and R' is an alkyl group having no more than 25 carbon atoms or an aryl group having no more than three ring members, said group being derived from a moiety containing a hydroxyl group on the nitrogen-bound carbon atom.

2. The polymer of claim 1 wherein R and A are derived from an alkyl compound having no more than 20 carbon atoms.

3. The polymer of claim 1 wherein R and A are derived from an aryl compound having the general formula H$_3$C—CO—Ar—CO—CH$_3$, where Ar is a benzene, naphthalene or anthracene compound.

4. The polymer of claim 1 wherein B contains no more than 300 carbon atoms.

5. The polymer of claim 1 wherein R' is an alkyl group having no more than 25 carbon atoms.

6. The polymer of claim 1 wherein the reaction includes formation of an imine.

7. The polymer of claim 1 wherein the active-hydrogen atom of R is bound to a moiety selected from the group consisting of carbonyl, acyl, nitro, nitrilo, phenol, acetylene, alcohol, and thiol.

8. The polymer of claim 7 wherein HR is CH$_3$—CO—CH$_2$—.

9. The polymer of claim 7 wherein HR is HO—Ph—.

10. The polymer of claim 1 wherein A contains a sterically hindering group.

11. The polymer of claim 7 wherein HR is HO—Ph— and Ph denotes unsubstituted phenyl.

12. The polymer of claim 1 wherein R' contains one carbon atom.

13. The polymer of claim 1 wherein B contains at least one intervening group of the form N-R', wherein R' is an alkyl or aryl group that contains a hydroxyl group on the nitrogen-bound carbon atom.

14. A method of synthesizing a polymer, the method comprising the steps of:

a. providing a monomer of formula:

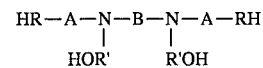

wherein R is an alkyl or aryl group that contains an active hydrogen atom H; A is a spacing group having at least one carbon atom; B is a spacing group having at least two carbon atoms; and R is an alkyl group having no more than 20 carbon atoms or an aryl group having no more than three ring members; and R' is an alkyl group having no more than 25 carbon atoms or an aryl group having no more than three ring members, said group being derived from a moiety containing a hydroxyl group on the nitrogen-bound carbon atom;

b. reacting the monomer to form an imine thereon; and c. polymerizing the imine-containing monomer to form cross-linked polymers of formula:

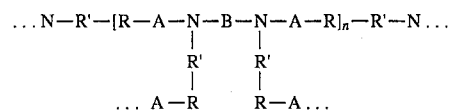

15. A method of synthesizing a polymer, the method comprising the steps of:

a. providing a first monomer of formula:

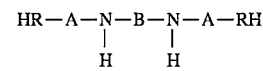

wherein R contains an active hydrogen atom H and is an alkyl group having no more than 20 carbon atoms or an aryl group having no more than three ring members; A is a spacing group having at least one carbon atom; B is a spacing group having at least two carbon atoms;

b. providing a second monomer of formula:

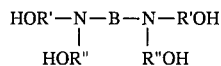

wherein B is a spacing group having at least two carbon atoms; and R' and R" are each an alkyl group having no more than 25 carbon atoms or an aryl group having no more than three ring members, said group being derived from a moiety containing a hydroxyl group on the nitrogen-bound carbon atom;

c. reacting the monomers to link the the R" groups of the second monomer to the N atoms of the first monomer; and d. reacting the monomers to lank the N atoms of the second monomer with the R' groups of the first monomer to form cross-linked polymers of formula:

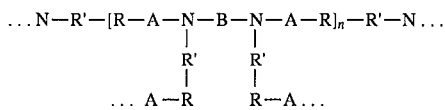

16. A method of synthesizing a polymer, the method comprising the steps of:

a. providing a first monomer of formula:

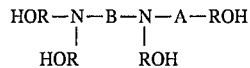

wherein R is derived from a moiety containing a hydroxyl group on the nitrogen-bound carbon atom and is an alkyl group having no more than 20 carbon atoms or an aryl group having no more than three ring members; A is a spacing group having at least one carbon atom; B is a spacing group having at least two carbon atoms;

b. providing a second monomer of formula:

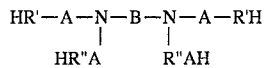

wherein A is a spacing group having at least one carbon atom; B is a spacing group having at least two carbon atoms; and R' and R" are each an alkyl group having no more than 25 carbon atoms or an aryl group having no more than three ring members, said group being derived from a moiety containing at least one active hydrogen atom; and c. reacting the monomers to link the the R" and R' groups of the second monomer to the N atoms of the first monomer to form cross-linked polymers of formula:

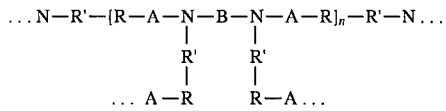

17. A method of synthesizing a polymer, the method comprising the steps of:

a. providing a first monomer of formulas

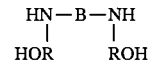

wherein R is derived from a moiety containing a hydroxyl group on the nitrogen-bound carbon atom and is an alkyl group having no more than 20 carbon atoms or an aryl group having no more than three ring members; and B is a spacing group having at least two carbon atoms;

b. providing a second monomer of formula:

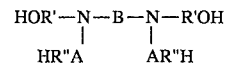

wherein A is a spacing groups having at least one carbon atom; B is a spacing group having at least two carbon atoms; and R' and R" are each an alkyl group having no more than 25 carbon atoms or an aryl group having no more than three ring members, said group being group derived from a moiety containing at least one active hydrogen atom;

c. reacting the monomers to link the the R" groups of the second monomer to the N atoms of the first monomer; and d. reacting the monomers to link the N atoms of the first monomer with the R' groups of the second monomer to form cross-linked polymers of formula:

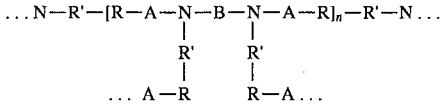

* * * * *